United States Patent [19]

Hamada et al.

[11] Patent Number: 4,530,085
[45] Date of Patent: Jul. 16, 1985

[54] RECONFIGURATION CONTROL METHOD FOR A LOOP-TYPE DATA NETWORK

[75] Inventors: Takuji Hamada; Masahiro Takahashi, both of Hitachi; Sadao Mizokawa, Katsuta; Hitoshi Fushimi; Seiichi Yasumoto, both of Hitachi, all of Japan

[73] Assignee: Hitachi, Ltd., Tokyo, Japan

[21] Appl. No.: 482,701

[22] Filed: Apr. 6, 1983

[30] Foreign Application Priority Data

Apr. 7, 1982 [JP] Japan ................ 57-56543

[51] Int. Cl.³ .................... H04J 3/14; H04Q 9/00
[52] U.S. Cl. ........................... 370/15; 370/16
[58] Field of Search ............ 370/13, 15, 16, 88, 370/87; 340/825.16

[56] References Cited

U.S. PATENT DOCUMENTS

| 3,743,938 | 7/1973 | Davis | 370/15 |
| 4,002,847 | 1/1977 | Dail | 370/16 |
| 4,048,446 | 9/1977 | Hafner et al. | 370/16 |
| 4,190,821 | 2/1980 | Woodwaid | 370/16 |
| 4,370,744 | 1/1983 | Hirano et al. | 370/16 |
| 4,380,061 | 4/1983 | Mori et al. | 370/16 |
| 4,455,645 | 6/1984 | Mijioka et al. | 370/16 |

FOREIGN PATENT DOCUMENTS 56-79552 of 1981 Japan .

Primary Examiner—Douglas W. Olms
Assistant Examiner—Curtis Kuntz
Attorney, Agent, or Firm—Antonelli, Terry & Wands

[57] ABSTRACT

This invention discloses a loop-back control method for loop-type data transmission systems in which, when a trouble occurs on both transmission lines of two systems, two stations adjacent to the trouble region return signals toward a control station in response to a command from the control station, thereby to separate the trouble region and continue the operation. According to this invention, when the control station detects the occurrence of a trouble on the transmission lines of the two systems, it sends out a broadcast command to search for the trouble point to the transmission lines of both systems and thereafter a loop-back command is issued so that the stations adjacent to the trouble point can loop-back the transmission.

8 Claims, 19 Drawing Figures

RECONFIGURATION CONTROL METHOD FOR A LOOP-TYPE DATA NETWORK

This invention relates to loop or ring-type data networks in which a plurality of stations and a station for monitoring the network are connected in the form of a loop with transmission lines of two systems operating in opposite directions, and more particularly to a reconfiguration control method for a loop-type data network which operates when failure occurs on both loops to cause the signal stream to be rerouted such that the resulting configuration consists of a loop which bends back on itself at either side of the failure.

Hereinafter, the reconfiguration control is called a loop back control and a station which commands the loop back control is called a control station.

A loop-back control is publicly known, where at the occurrence of a failure on both loops, two stations adjacent to the trouble region send back signals to the control station to separate the trouble region and continue the operation. An example of such a system is disclosed in Japanese patent application Laid-Open No. 79552/81.

As a control method for effecting a loop-back operation, there are two kinds of conventional methods. In the first method, each station (hereinafter referred to as a ST) detects an abnormal state independently and proceeds to the loop-back operation. In the second method, the control station (hereinafter referred to as a CST) detects the abnormal state and initiates the loop-back operation.

According to the first method, a trouble on the loop is continually monitored by each ST. When signal interruption is detected on one side of the loop, control is effected in such a manner that signal repetition on this loop is stopped. Then, the signal received from the other loop is sent back to the failure side. This method need no loop back command from the CST, and no software operation at each station. Therefore, reconfiguration of the loop is finished in a short time. However, if an unstable failure such as unreliable connection of connectors of the transmission line occurs, loop configuration is also unstable. Furthermore, since each ST starts the configuration of the loop arbitrarily, it has been difficult to synchronize the operation of the whole network.

According to the second method, each ST is generally forced to the loop-back state by the CST one by one. If it is judged that normal transmission is occurring, the loop-back state of the station is released. Then, the next ST is forced to the loop-back state. This operation is repeated sequentially. In the last step, only the ST adjacent to the trouble point is moved to the loop-back state. On the other hand, in the foregoing Japanese patent application Laid-Open No. 79552/81, it is proposed that the loop-back operation be performed by a broadcast command. In the former method, each ST is forced to the loop-back state sequentially and loops are checked by the CST. This increases reliability even under noisy conditions. Therefore, this method has the merit of providing a stable network. However, due to the interposition of software control in the CST, the method has the following defect. Namely, the time required for obtaining the loop-back configuration is long. This drawback becomes remarkable when software control is accomplished by microcomputer or the number of STs is large. Therefore, this method has not been applied to process control, etc. where real time control is needed. The loop-back configuration receiving a broadcast command from the CST, as disclosed in Japanese Pat. No. 56-79552, aims at reduction of the configuration time. However, this method has a disadvantage by reason of the fact that the station bends back the command to the transmission line immediately after receiving the command. Therefore, a control is required by which the next commands are received at both sides of each station so as to make the receiving of the bend back side ineffective.

The object of this invention is to provide a loop-back control method for a loop-type data transmission system which can accomplish a high speed stable loop-back control in response to any trouble on the transmission lines and in the ST's.

The characteristic of this invention is as follows: if an occurrence of trouble on two loops is detected, a broadcast command is first sent out to search for the trouble point on the loop. Thereafter, a loop-back command is sent out. In this case, each ST passes this command and continually transmits a monitor signal, which is different from the normal signal, to the loop in the opposite direction. Furthermore, when each ST receives the monitor signal transmitted from the other ST's, they stop the transmission of their own monitor signal. Next, in response to the loop-back command sent out from the CST, only that ST that is still transmitting the monitor signal bends back the received signal from the side of detection of the loop-back command toward the CST.

Other objects and characteristics of this invention will be made apparent from the following explanation and description of claims in conjunction with the accompanying drawings, in which:

FIGS. 8(A) and (B) show a flow chart for the explanation of the operation of the CST1 and a diagram showing the input-output relation of MC100, respectively;

Figure 1:
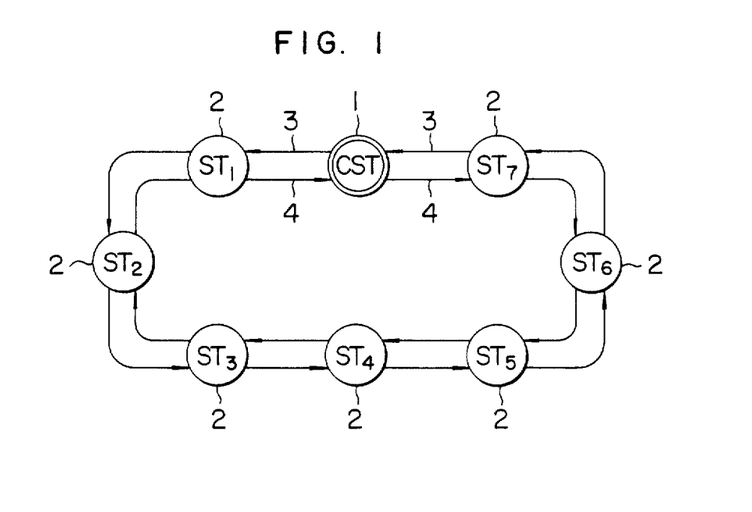
FIG. 1 is a diagram showing one example of the usual loop or ring-type data transmission network to which this invention is applied.

In FIG. 1 showing an example of the usual loop or ring-type data transmission system to which this invention is applied, 1 denotes a control station (CST) for monitoring troubles in the system and controlling restoration of normal transmission, 2 denotes stations ($ST_1$-$ST_7$) for enabling communication between various terminals (not shown), and 3 and 4 denote transmission lines for transmitting signals in opposite directions.

Now, for the sake of explanation, we will refer to the transmission lines 3 and 4 as those of systems A and B, respectively. Data transmission is effected by using either one of these transmission lines. If a failure occurs on a currently used transmission line which is transmitting data, switching to the other auxiliary transmission line is effected to continue the data transmission. If a failure occurs on both systems, the loop-back operation is performed.

Switching of the transmission line due to a failure in one system is not a primary object of the present invention. We will describe hereinafter only the loop-back operation.

Figure 2:
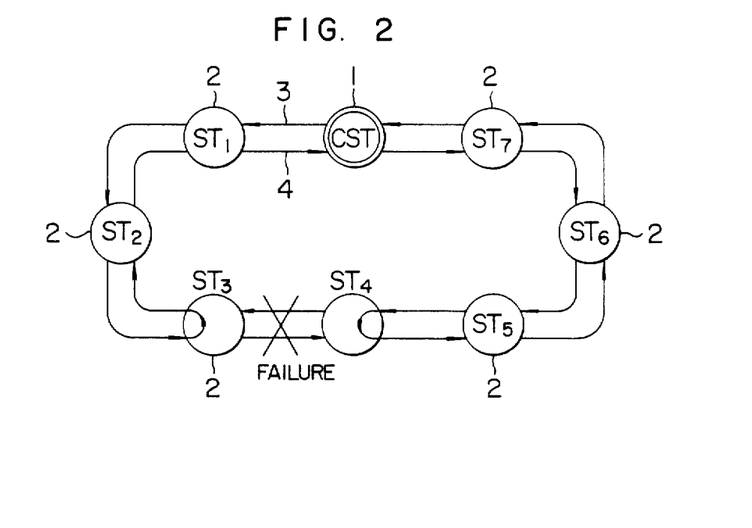
FIG. 2 is a diagram for explaining one form of operation of the network of FIG. 1.

FIG. 2 shows a condition of FIG. 1, where a failure has occurred in both transmission systems between ST3 and ST4 and loop-back is being performed at both stations.

This invention relates to the control operations of CST1 and ST2 required to form the loop-back reconfiguration of the network if a failure occurs on both A and B systems of transmission line.

Figure 3:
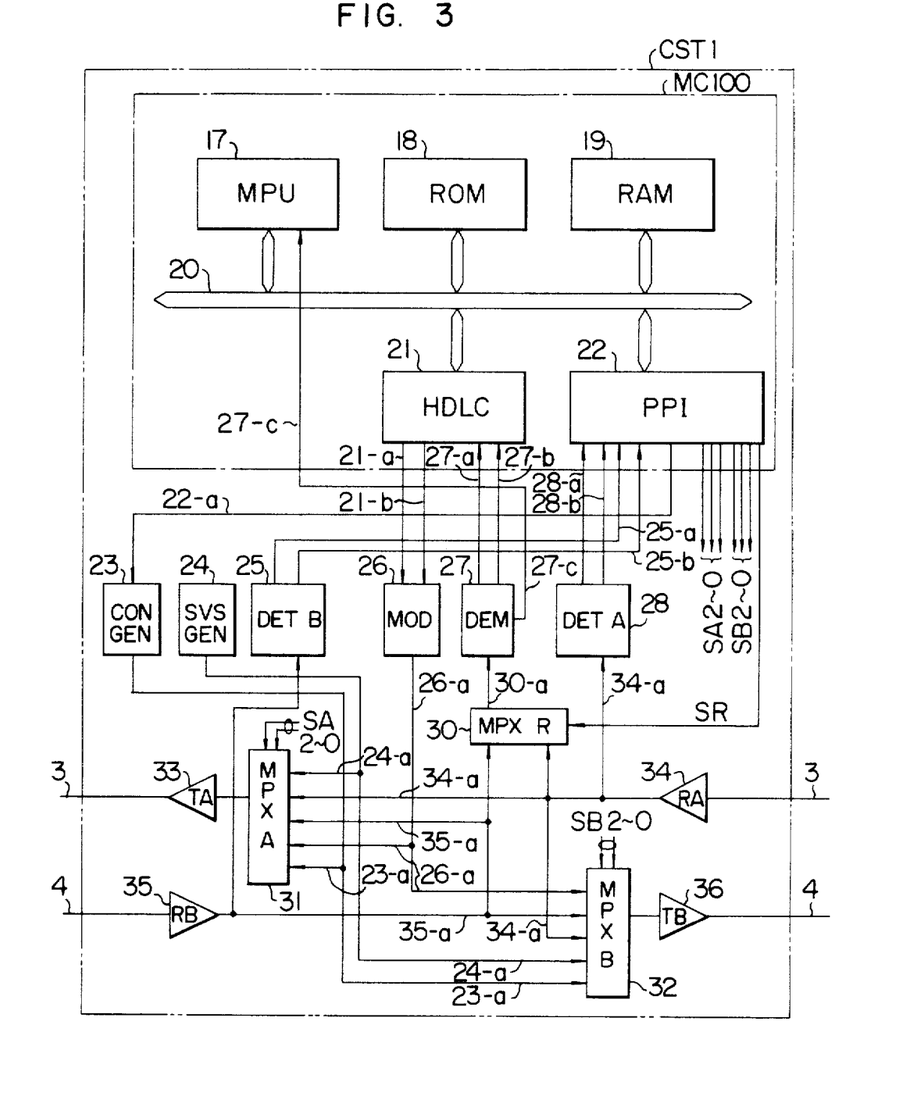
FIGS. 3 and 4 are schematic circuit diagrams of a control station (CST) and a station (ST) according to one embodiment of this invention, respectively.
Figure 4:
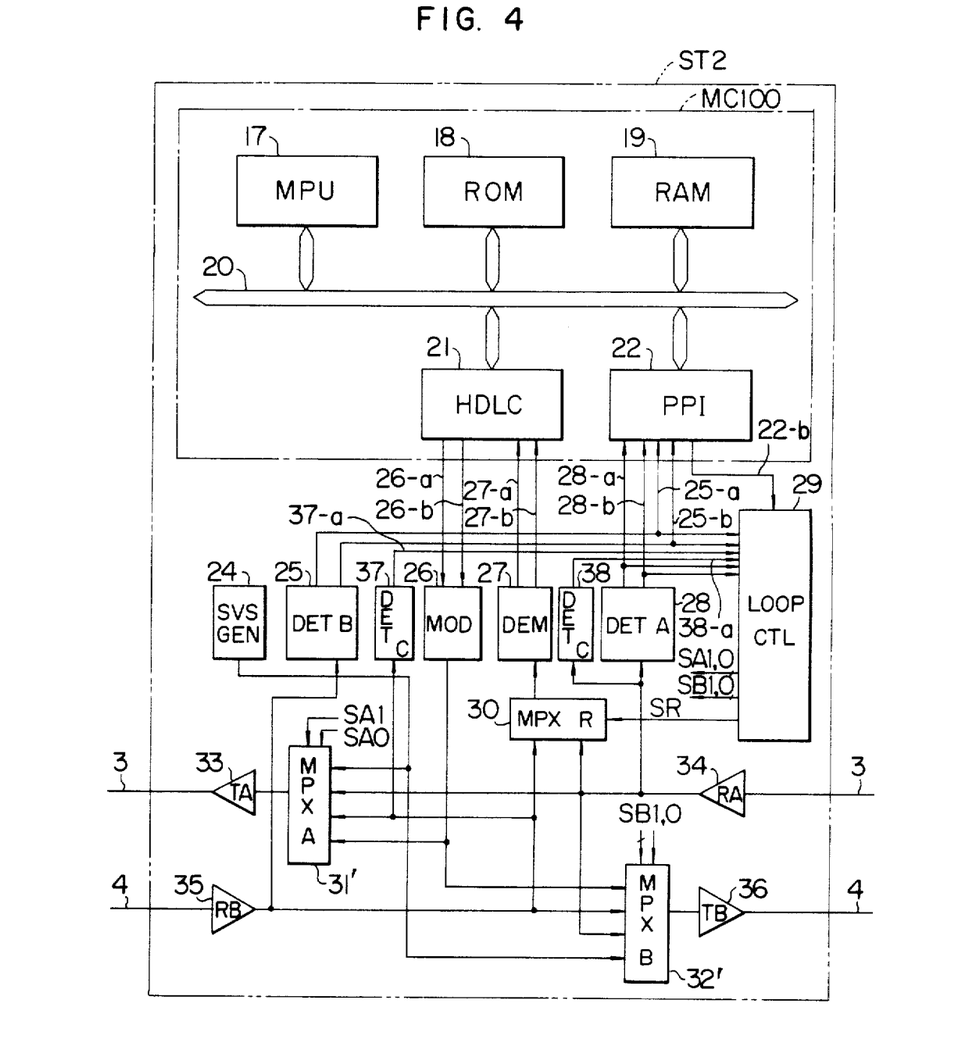

FIGS. 3 and 4 show one embodiment of the CST1 and the ST2 for realizing the loop-back control method.

In FIG. 3, CST1 includes a microcomputer (MC100) comprising mainly a microprocessor unit (MPU) 17, a read-only memory (ROM) 18 containing a microprogram, a random access memory (RAM) 19 used as a data buffer etc., an internal bus 20, a communication control LSI (HDLC) 21 following the transmission procedure of high level data link control and other circuits 23 to 36.

The signal for the A system transmission line 3 is received from a receiving circuit 34 while the signal for the B system transmission line 4 is received from a receiving circuit 35. These signals are introduced into the HDLC 21 of the microcomputer MC100 through a multiplexer 30 and a demodulator 27. Data on line 27-$a$ demodulated by the demodulator 27 is introduced together with clock on line 27-$b$ into the HDLC 21 and decoded by the microcomputer MC100. If the output signal of the multiplexer 30 is absent, the demodulator 27 interrupts the MC100 through a signal line 27-$c$. The multiplexer 30 decides in accordance with a switching signal SR from the MC100 either to receive the output signal 34-$a$ of the receiving circuit 34 or the output signal 35-$a$ of the receiving circuit 35.

Transmission from MC100 is effected as follows. Transmission data on line 21-$a$ and a transmission clock on line 21-$b$ are introduced into a modulator circuit 26, where they are converted into a Manchester code as shown in FIG. 6(A). The coded signal is then transmitted to the A- and B-systems of the transmission lines 3 and 4 through a multiplexer 31 and a transmission circuit 33, through a multiplexer 32 and a transmission circuit 36, or through both of these circuits.

Multiplexers 31 and 32 receive the output on line 24-$a$ of a monitor signal generating circuit 24 which generates a monitor signal as shown in FIG. 6(B). They can also receive signals on lines 34-$a$ and 35-$a$ from the receiving circuits 34 and 35, respectively, the transmission signal on line 26-$a$ from the demodulator circuit 26, and the output on line 23-$a$ from a simultaneous instruction generating circuit 23 for later-mentioned trouble search. The multiplexers 31 and 32 select one of these signals in accordance with the content of 3-bit control signals SA2-0 and SB2-0 from the MC100.

The multiplexer 31 selects the output 24-$a$ of the monitor signal generating circuit 24 if the controls signals SA2, SA1 and SA0 are in the state "0, 0, 0"; selects the output 34-$a$ of the A-system receiving circuit 34 if "0, 1, 0"; selects the output 35-$a$ of the B-systtem receiving circuit 35 if "0, 0, 1"; selects the output of its own CST (output 26-$a$ of the modulation circuit (MOD) 26) if "0, 1, 1"; and selects the output 23-$a$ of the simultaneous instruction generation circuit 23 for trouble search if "1, 0, 0".

The multiplexer 32 selects the output 24-$a$ of the monitor signal generating circuit if the control signals SB2, SB1 and SB0 are in the state "0, 0, 0"; selects the output 35-$a$ of the B-system receiving circuit 35 if "0, 1, 0"; selects the output 34-$a$ of the A-system receiving circuit 34 if "0, 0, 1"; selects the output of its own CST (output 26-$a$ of MOD 26) if "0, 1, 1"; and selects the output 23-$a$ of the simultaneous instruction generation circuit 23 for trouble search if "1, 0, 0".

The multiplexer 30 selects the output on line 34-$a$ of the A-system receiving circuit 34 if SR is "0", and selects the output on line 35-$a$ of the B-system receiving circuit 35 if SR is "1". Now, we assume that data is transmitted through the A-system transmission line 3 and that the B-system transmission line is a waiting system. In this case, as described in more detail later, SR=0, [SA2, SA1, SA0]=[0, 1, 0] or [0, 1, 1] and [SB2, SB1, SB0]=[0, 0, 0] or [0, 1, 0]. MC100 is connected to the A-system transmission line 3 if SR=0 while it is connected to the B-system transmission line 4 if SR=1.

Detection circuits DETB 25 and DETA 28 receive the signals of receiving circuits 35 and 34, respectively. They indicate the presence of data to the signal lines 25-$a$ and 28-$a$ when the received signals contain such data as shown in FIG. 6(A), and also the presence of a monitor signal to the signal lines 25-$b$ and 28-$b$ when the received signals contain such data as shown in FIG. 6(B). MC100 generates control signals SA2—0 and SB2—0 in accordance with the information on the signal lines 25-$a$, $b$ and 28-$a$, $b$ and the information of the signal line 27-$a$ from the modulator circuit 27, thereby to control multiplexers 31 and 32.

In FIG. 4 showing one embodiment of ST2, the same reference numerals are used to denote like parts in FIG. 3. The whole constitution is similar to that of the CST1 of FIG. 3. Different points are: detecting circuits 37 and 38 are provided separately for the detection of the simultaneous command for trouble search and a loop controller (LOOP CTL) 29 is provided independently of the microcomputer for the control of multiplexer 30, 31 and 32.

The basic constitution of MC100 of the CST1 is the same as that of MC100 of the ST2 so that the same reference numerals are used. Only the manner of control is different.

Figure 7:
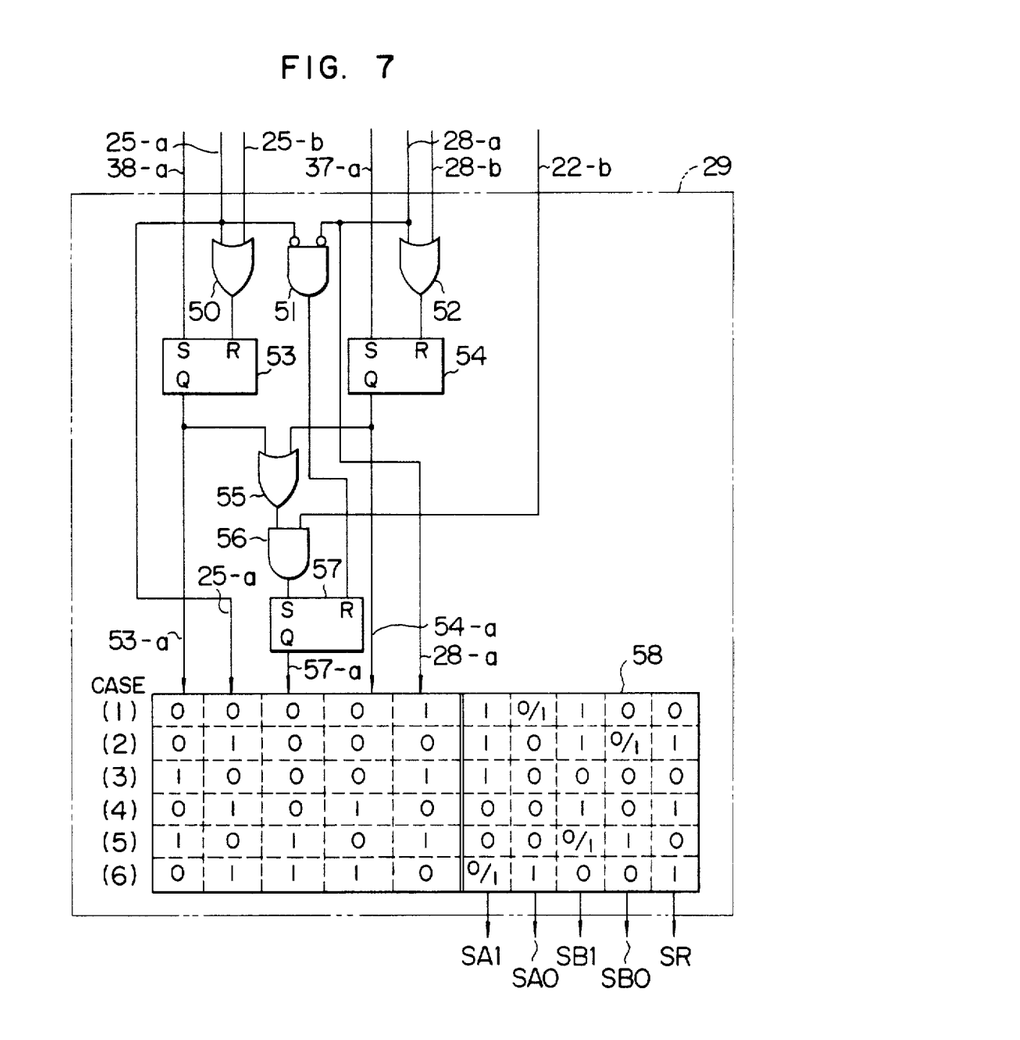
FIG. 7 is a diagram showing one concrete example of the loop controller 29 shown in FIG. 4.

As shown in FIG. 7, LOOP CTL29 is constituted with OR gates 50, 52 and 55, a NAND gate 51, an AND gate 56, S-R flip-flops 53, 54 and 57, and a programmable logic array (PLA) 58. PLA29 receives the output of the detecting circuit 25, the outputs 25-$a$ and 25-$b$ of the detecting circuit 25, the outputs 28-$a$ and 28-$b$ of the detecting circuit 28, the outputs 37-$a$ and 38-$a$ of the detecting circuits 37 and 38, respectively, and the loop-back instruction 22-$b$ of MC100; and generates SA1, 0, SB1, 0 and SR.

Then, when the detecting circuit 38 detects a trouble search command from the A-system of transmission line 3, the output 38-$a$ becomes logically "1" and the flip-flop 53 which stores the trouble search mode of the A-system is set. When the detecting circuit 37 detects a trouble search command from the B-system of the transmission line 4, the output 37-$a$ becomes logically "1" and the flip-flop 54 which stores the trouble search mode of the B-system is set. Flip-flops 53 and 54 are reset by the outputs 25-a, 25-b and 28-a, 28-b of the detecting circuits 25 and 28 of opposite systems, respectively. The outputs of the flip-flops 53 and 54 are sent to the one input of AND gate 56 through the OR gate 55. When MC100 decodes the loop-back command from CST1 and sets the trigger signal 22-b for the loop-back operation at logic level "1", the flip-flop 57 is set.

PLA 58 receives the output 53-a of flip-flop 53, the output 54-a of flip-flop 54, the output 57-a of flip-flop 57 and the outputs 25-a and 28-a, and generates control signals SA1, SA0, SB1 and SB0 in accordance with the logics as shown by the contents of PLA28 corresponding to cases (1) to (6).

The multiplexer 31 selects the output 24-a of the monitor signal generation circuit 24 if SA1 and SA0 are 37 0,0"; selects the output 34-a of the receiving circuit 34 of the A-system if "1, 0"; selects the output 35-a of the receiving circuit of the B-system if "0, 1"; and selects the output of its own ST (the output 26-a of MOD26) if "1, 1".

The multiplexer 32 selects the output 24-a of the monitor signal generation circuit 24 if SB1 and SB0 are "0, 0"; selects the output 35-a of the receiving circuit 35 if "1, 0"; selects the output 34-a of the receiving circuit 34 of the A-system if "0, 1"; and selects the output of its own ST (output 26-a of MOD 26) if "1, 1".

The multiplexer 30 selects the output 34-a of the receiving circuit 34 of the A-system if SR is "0", and selects the output 35-a of the receiving circuit 35-a of the B-system if SR is "1".

Figure 5:
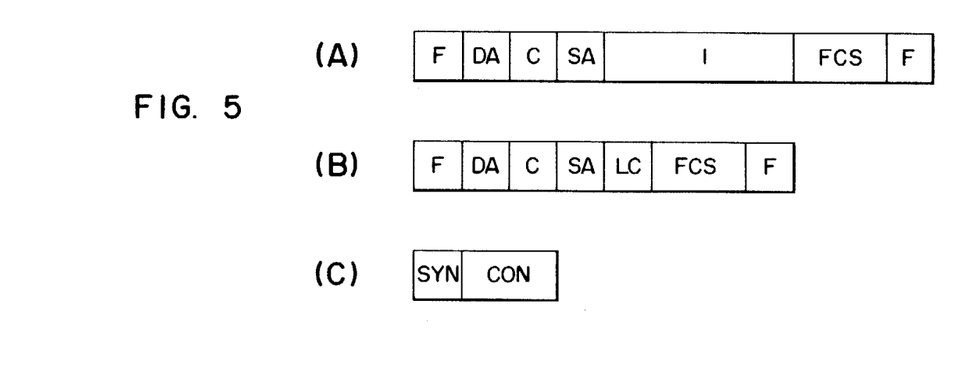
FIGS. 5(A) to 5(C) show an embodiment of the transmission format used by the present invention.

FIG. 5 shows the format of the data signal flowing on the transmission lines. FIG. 5(A) shows the frame of the usual HDLC procedure; FIG. 5(B) shows the network constitution frame containing a loop-back command LC; FIG. 5(C) shows the broadcast command for trouble search.

In FIG. 5, F denotes a flag pattern opening or closing part of the transmitted data, DA a distribution address, I an information frame, FCS a frame check pattern, LC a loop-back command, SYN a special synchronization pattern, and CON a trouble search command.

Figure 6:
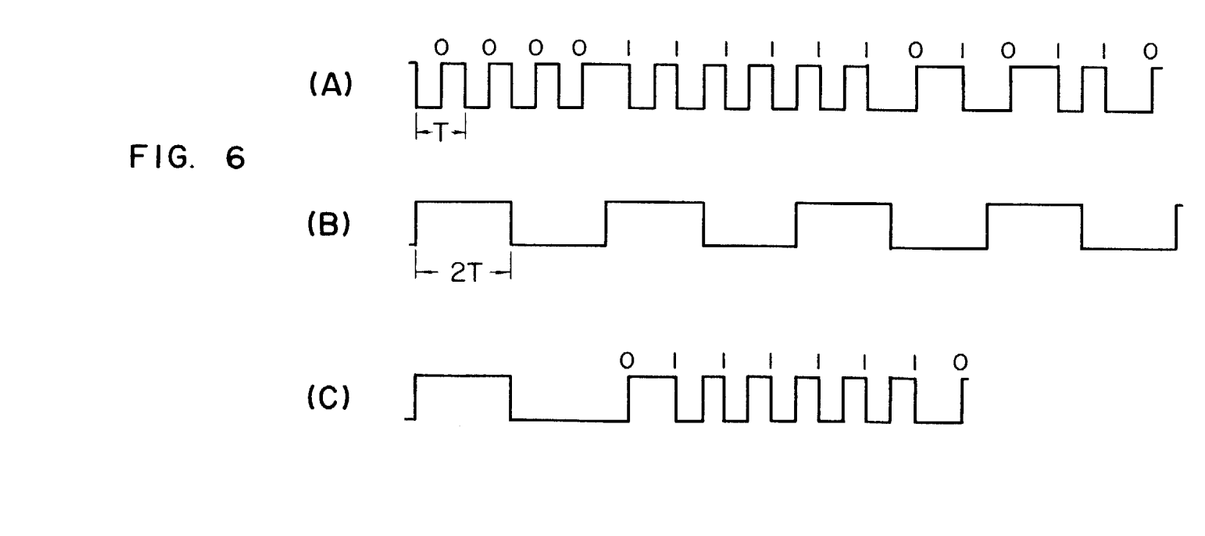
FIGS. 6(A) to 6(C) show signal waveforms used by an embodiment of this invention.

FIG. 5 classifies the format showing the contents of the transmitted data, while FIG. 6 shows an example of the waveforms of the transmitted data. FIG. 6(A) shows the waveform of the signal used for data transmission. This signal shows Manchester coding, whose phase is inverted by signals "0" and "1". The period is given by T. FIG. 6(B) shows a monitor signal whose period is equal to 2T, i.e. twice the period of the signal of FIG. 6(A) used for data transmission. Discrimination between the data signal and the monitor signal can be easily accomplished by hardware. The monitor signal of FIG. 6(B) is flowing through the auxiliary loop to monitor the state of transmission line continually. When each ST receives the data signal and the monitor signal from both systems, MC100 is connected to the side of data signal reception. Namely, a check of SR=0, SR=1 is done.

Since the pattern of the trouble search command of FIG. 6(C) should be discriminated easily from normal data frames, it is made to have a waveform consisting of a monitor signal waveform with a period of 2T and a succeeding unique bit pattern.

Figure 8:
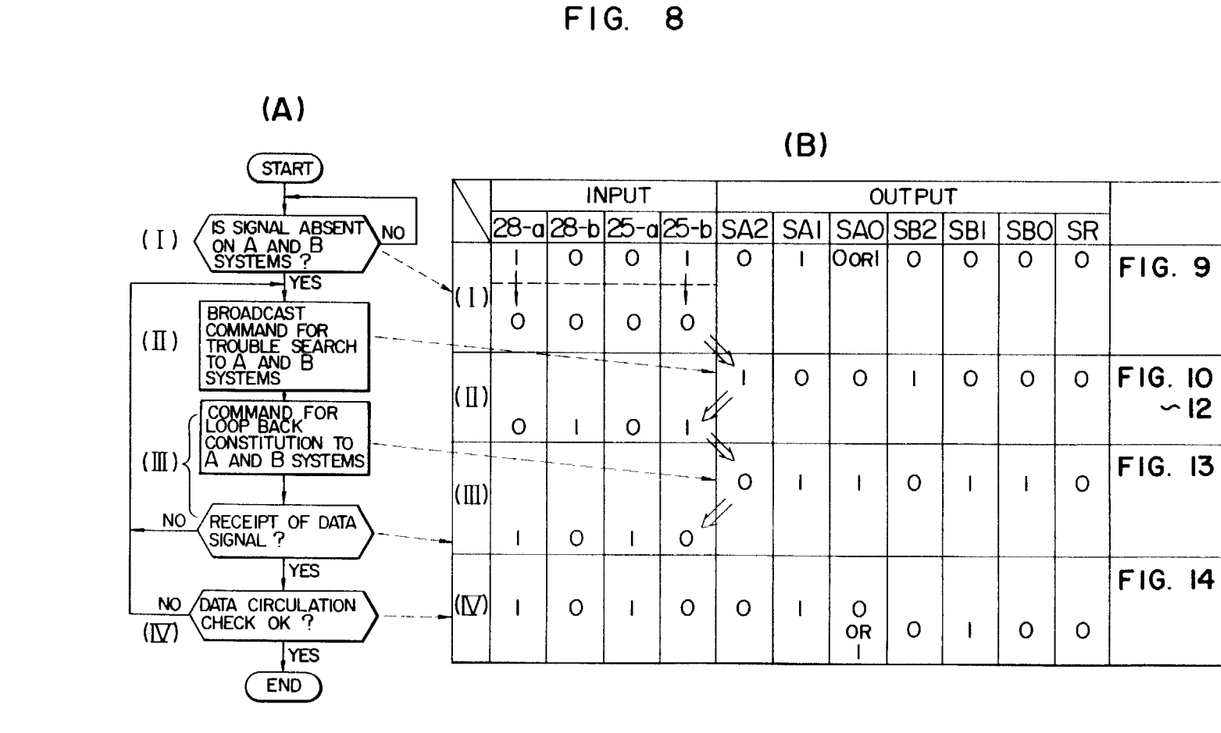
Figure 9:
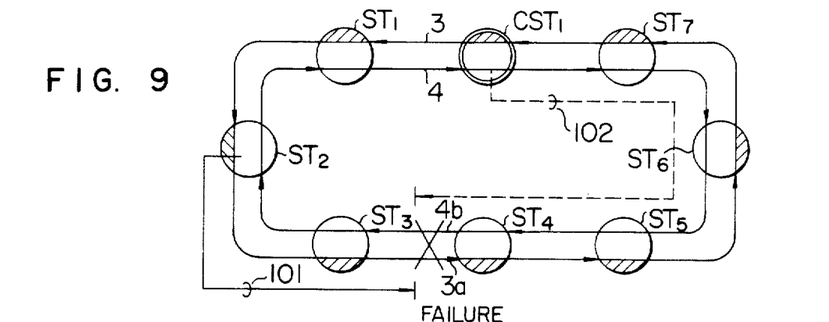
FIGS. 9 to 14 show the transition of the states of the CST and ST's and the kind and the direction of transmitted signals used for the explanation of the operation of this invention.

The manner of controlling the network constitution against a failure on the transmission lines through the loop-type data transmission system including CST1 and ST1 will be explained next with reference to state transition diagrams as shown in FIGS. 8 and 9.

FIG. 9 shows a case where both transmission lines 3 and 4 are broken between $ST_3$ and $ST_4$. A data signal 101 as well as a monitor signal 102 from $ST_2$ are interrupted at this region.

Here, the data signal 101 is a Manchester code as shown in FIG. 6(A) and the monitor signal 102 is a signal with a period twice as large as that of the Manchester code as shown in FIG. 6(B).

Before the transmission lines are broken, the data signal 101 has been flowing through the transmission line 3 while the monitor signal has been flowing through the transmission line 4. At CST 1 and $ST_1$ to $ST_7$, Microcomputers MC100 are connected on the side shown by oblique lines in FIG. 9.

Connection of MC100 on the side of the A-system transmission line 3 means that control signals SR and SA2—0 are sent to multiplexers 30 and 31 so that the output on line 34-a of the receiving circuit 34 is introduced into the demodulator circuit 27 through the multiplexer 30 and that the output on line 26-a of the modulator circuit 26 is given to the A-system transmission line 3 through the multiplexer 31 and the transmission circuit 33.

When the transmission line 3 is broken, the demodulator circuit 27 CST1 detects the absence of a signal and interrupts MPU17 of the microcomputer MC100 through the line 27-c. Then, MC100 receives the outputs 25-a, b of the detection circuit 25 and the output of the detection circuit 28 as shown by the step (I) of FIG. 8(A) and checks whether the outputs of the receiving circuits 34 and 35 of A- and B-systems both have no signal. In the case when the transmission lines 3 and 4 are both broken, the outputs on lines 28-a and 25-a change from "1" to "0" and the MC100 recognizes this, as shown in the step (I) of FIG. 8(B). Outputs on lines 25-a and 28-a are generated when a data signal is being received. Outputs on lines 25-b and 28-b are generated when a monitor signal is being received. They are not generated in the absence of signal, as described before. FIG. 8(B) shows the relation between the input and the output of the microcomputer 100 in steps (I) to (IV) which correspond to the steps of FIG. 8(A).

Figure 10:
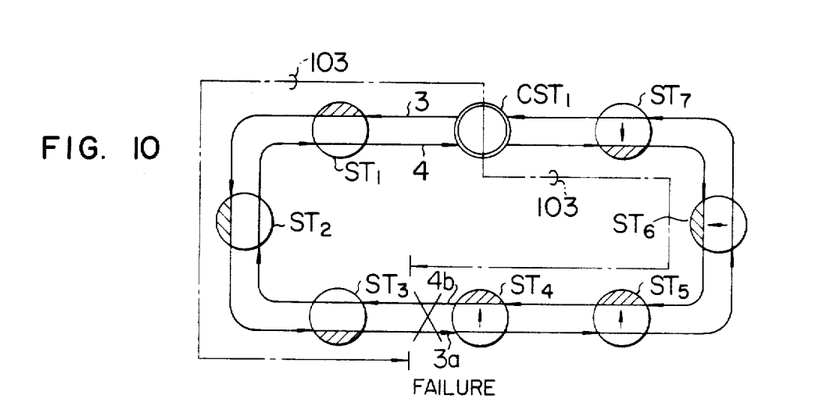

Next, CST1 sends out a broadcast command 103 (with a pattern shown in FIG. 6(C)) for searching for the trouble point of the transmission lines 3 and 4 of both systems, as shown in the step (II) of FIG. 8(A) and FIG. 10. This simultaneous command 103 is sent out from a trouble search generation circuit 23 toward the transmission lines 3 and 4 through respective multiplexers 31 and 32. Control signals SA2—0, SB2—0, and SR of MC100 in this state are as shown in the step (II) of FIG. 8(B). A microcomputer is connected to $ST_4$ to $ST_7$ on the side of the B-system transmission line 4, as shown by an arrow.

Figure 11:
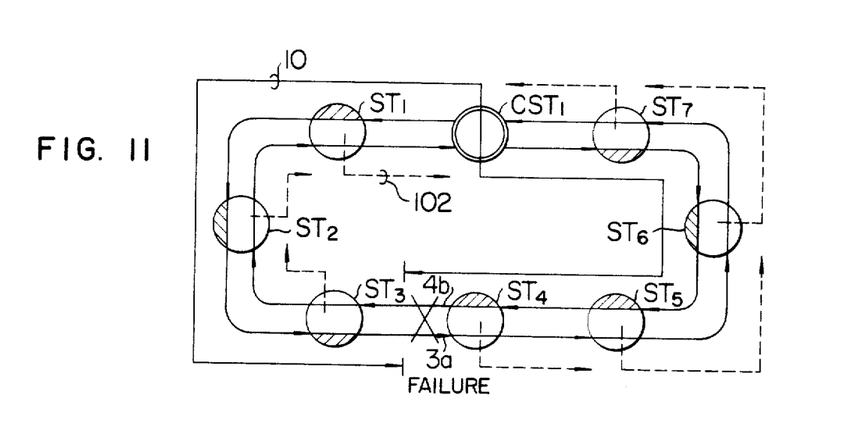

When an ST receives this broadcast command, either the flip-flop 53 or 54 of FIG. 7 is set. As in the case (3) or (4), [SA1, SA0] and[SB1, SB0] are set as [0, 0]. As shown in FIG. 11, the monitor signal 102 is sent out from each ST to the CST1 on the other transmission line from that transmission line on which it has received the broadcast command. In each ST, the monitor signal 102 is generated by the monitor signal generating circuit 24 of FIG. 4 and sent out to the transmission line 3 or 4 through the multiplexer 31 or 32. When the detecting circuit 38 connected to the A-system transmission line 3 detects the broadcast command, the monitor signal is sent out to the B-system transmission line 4. When the detecting circuit 37 connected to the B-system transmission line 4 detects the broadcast command, the monitor signal is sent out to the A-system transmission line 3.

In this state, $ST_1$, $ST_2$ and $ST_5$ to $ST_7$ which have received the monitor signal 102 from the upstream side interrupt transmission of this signal (only perform repeat operation). Thus, only $ST_3$ and $ST_4$ adjacent to the trouble point continue transmission.

Figure 13:
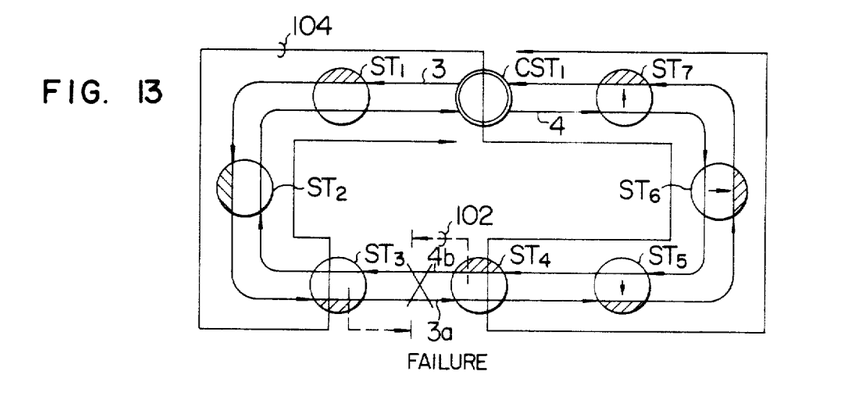

Thereafter, as shown in the step (IV) of FIG. 8(A) and FIG. 13, CST1 sends a loop-back command to the last stations (in the present case $ST_3$ and $ST_4$) in order to initiate transfer to the loop-back configuration, and checks the receipt of a data signal.

$ST_3$ and $ST_4$ which have received the loop-back command 104 make the loop-back connection and return this received signal to the other transmission line, but send out the monitor signal 102 to the side of the troubled transmission lines 3a and 4b. This corresponds to the case (5) or (6) of FIG. 7.

Figure 14:
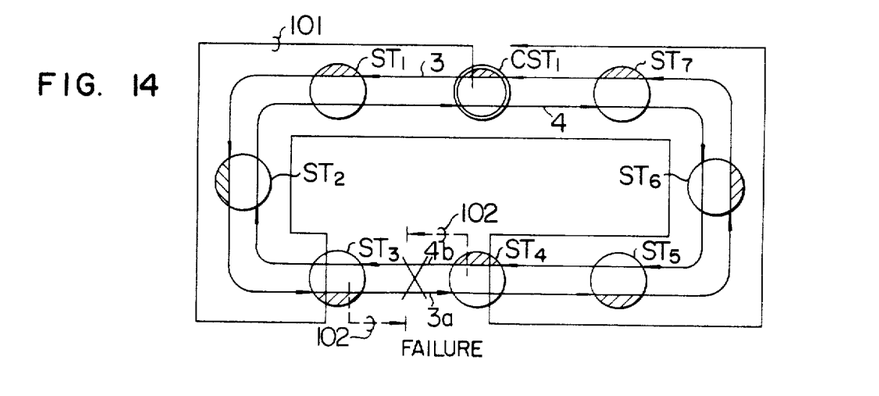

Next, CST1 verifies the circulation of data on the loop-back transmission lines constituted as shown in the step IV of FIG. 8(A) and FIG. 14, and proceeds to the usual data transmission mode. Thereafter, CST1 identifies the ST which is in the loop-back operation in order to identify the trouble point.

The broadcast command 103 for trouble search and the loop-back command 104 are sent out several times. This makes the control of the loop-back operation secure.

As apparent from FIG. 7, flip-flops 53 and 54 for holding the trouble search mode and the flip-flop 57 for holding the loop-back operation mode make their operations reliable by receiving the broadcast command 103 for trouble search and the loop-back command 104 several times.

In FIG. 4, since the microcomputer 100 receives the loop-back command from the transmission line to which it is connected, the microcomputer can easily decode the loop-back command 104.

Figure 12:
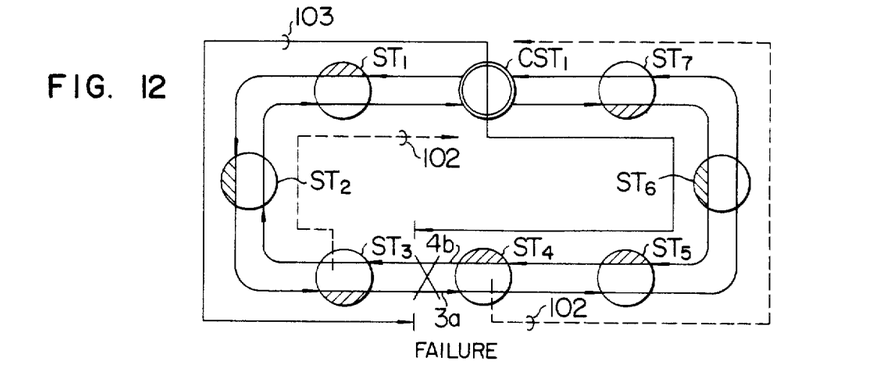

As described above, according to this invention, when CST1 detects a failure on the transmission lines of both systems, a preparation step as shown in FIG. 12 is taken by the broadcast command. Next, the loop-back arrangement as shown in FIG. 13 is effected by the loop-back control. The loop-back operation is made securely, because the broadcast command and the loop-back command are sent out several times.

Furthermore, since the commands from CST1 are sent out to each ST not sequentially but simultaneously, no time is lost by interposed software control. The time from the occurrence of a fault until the loop-back operation is completed can be remarkably reduced. More specifically, the time of 200 to 300 msec required by individual commands depending on the number of ST is to the order of 10 msec.

Although in the above embodiment the monitor signal 102 is selected to have a period twice that of the data signal 101, it may have other forms so long as it can be discriminated from the data signal 101.

What is claimed is:

1. A loop-back control method for a loop-type data transmission system comprising first and second transmission lines for transmitting signals in opposite transmission directions, respectively, and a plurality of stations and at least one control station connected to said transmission lines in the form of a loop, wherein when a fault occurs on said two loops, two stations adjacent to the region of the fault turn back signals received on one of said transmission lines to the other transmission line in response to a command from said control station in order to separate said fault region and continue the transmission, and wherein said control station for detecting the occurrence of a fault on both of said transmission lines first generates a broadcast command on said two transmission lines to detect the two stations adjacent the region of the fault, and thereafter said control station sends out a loop-back command to said two stations adjacent to the region of the fault to cause said two stations exclusively to switch signals received on one of said transmission lines to the other transmission line.

2. A loop-back control method for a loop-type data transmission system according to claim 1, wherein each station passes said broadcast command received from said control station on one transmission line, sends out continually a monitor signal different from a normal data signal to the other transmission line having a transmission direction opposite to that of said one transmission line, receives the monitor signal sent from another station on said other transmission line and then stops sending out this monitor signal to other stations upon receiving said monitor signal so that each station can identify the trouble point.

3. A loop-back control method for a loop-type data transmission system according to claim 2, wherein each station responds to the loop-back command sent out from said control station and returns the information received from the transmission line by which said station detects said loop-back command only when said station has been sending out said monitor signal.

4. A loop-back control method for a loop-type data transmission system according to claim 1, wherein said broadcast command and said loop-back command are continually sent out at several different times to perform a plurality of successive trouble search and loop-back operations.

5. A loop-back control method for a loop-type data transmission system according to claim 3, wherein each station comprises first and second memory means for storing the transmission line through which said broadcast command for trouble search is transmitted from said control station and third memory means for storing the presence of a loop-back command after said broadcast command and identifies a transmission line on which said monitor signal is transmitted and also a transmission line on which said data signal is bent back in accordance with the contents of said first, second and third memory means.

6. A loop-back control method for a loop-type data transmission system according to claim 5, wherein said first and second memory means reset their memory states by the receipt of a data signal and a monitor signal from the other transmission line.

7. A loop-back control system for a loop-type data transmission system according to claim 5, wherein said third memory means resets its memory state when the data signals from said first and second transmission lines are absent.

8. A loop-back control method for a loop-type data transmission system according to claim 2, wherein each station comprises a microcomputer having a function of receiving data from other stations and transmitting data to other stations, a multiplexer connecting said microcomputer to said first and second transmission lines and first and second detectors connected to said first and second transmission lines respectively to detect the receipt of data from the respective transmission lines; and said multiplexer is controlled to decide, depending on the outputs of said first and second detectors, which data on both of said transmission lines should be received.

* * * * *